(No Model.)
G. L. BARNES.
FRICTION CLUTCH.
No. 285,870.  Patented Oct. 2, 1883.
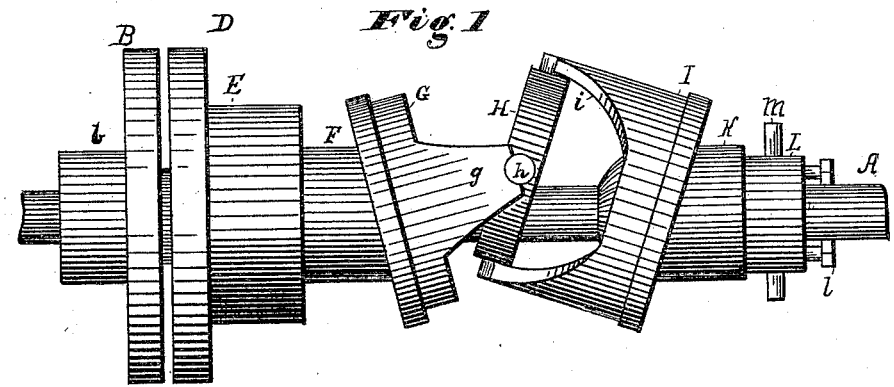
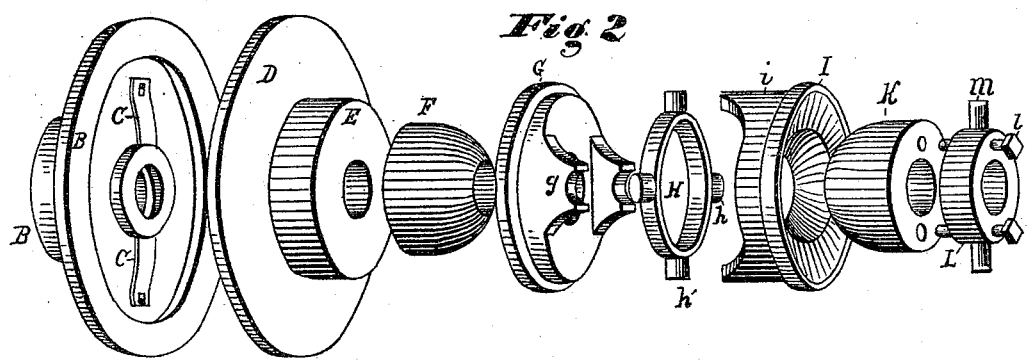
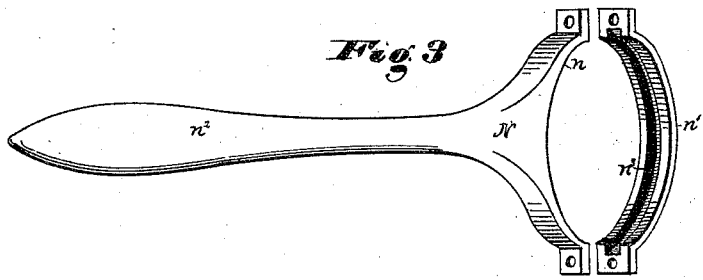
Witnesses.
Geo. Terry
Lewis W. Turner
Inventor.
George L. Barnes.

UNITED STATES PATENT OFFICE.

GEORGE L. BARNES, OF NORTH HAVEN, CONNECTICUT.

FRICTION-CLUTCH.

SPECIFICATION forming part of Letters Patent No. 285,870, dated October 2, 1883.

Application filed March 29, 1883. (No model.)

*To all whom it may concern:*

Be it known that I, GEORGE L. BARNES, a citizen of the United States of America, residing at North Haven, in the county of New Haven and State of Connecticut, have invented certain new and useful Improvements in Friction-Clutches, of which the following is a specification, reference being had therein to the accompanying drawings.

The object of my invention is to provide a friction-clutch which may be thrown in and out of gear by the operator with the greatest possible ease, and which shall at the same time be little liable to need repair, and be comparatively simple and inexpensive.

My invention consists of the hereinafter-described means for attaining said object.

In the drawings, Figure 1 represents a side elevation of my improved clutch; Fig. 2, a perspective view of the various parts, shown separate in order to more distinctly exhibit the details of construction; and Fig. 3, a perspective detail view of the clutch-lever.

Similar letters of reference indicate corresponding parts throughout the various views.

A is the driven shaft, on which the disk B is secured by means of the collar $b$. Said disk is countersunk on its inner surface, and has secured within said countersinking the radial springs C, for the purpose hereinafter set forth. Loose upon said shaft and in immediate juxtaposition to said disk is a second disk, D. This disk, upon the side next the disk B, is also countersunk, and on its opposite side, made integral with it, bears the pulley E, to which is attached the belt of the driving-shaft.

Encircling the shaft A and resting against the pulley E is the ball F, against which (also encircling said shaft) rests the disk G, recessed upon one side to form a socket. Said ball and disk (as will be seen) form a ball-and-socket joint and allow freedom of motion to the disk. From near the periphery of the disk, and extending at right angles therefrom, (on the opposite side from said ball,) are brackets $g$, whose extremities are provided with semicircular recesses to form bearings for the peripheral trunnions $h$ of the gimbal H. Said gimbal is provided with other peripheral trunnions, $h'$, at right angles to the former, and these trunnions have bearings in the brackets $i$, borne by a disk, I, of similar construction to the disk G. On the side of said disk opposite to the gimbal a socket is formed similar to that in disk G, and in this socket rests a second ball, K. It will be seen that by this construction the socket-disk I will have like freedom of movement with the aforesaid socket-disk G. Against the ball K rests a collar, L, and said ball and collar are connected together by set-screws $l$, by means of which the parts of the clutch are adjusted lengthwise. The said collar is also rigidly fixed to the shaft A by the pin M.

N, Fig. 3, is the clutch-lever, and is composed of the two semicircular sections $n\ n'$, to one of which is secured the handle $n^2$. The said sections $n\ n'$ are provided with an internal groove, $n^3$, adapted to fit the periphery of one of the socket-disks. The said sections are also provided with perforated ears, and when the lever is affixed to one of the socket-disks, bolts are introduced through said perforated ears, and the whole is locked in place by means of nuts.

The operation of my device is as follows: The various parts of the clutch are slipped upon the shaft A in the order shown and described. The friction-disk B (by means of collar $b$) and the collar L are secured to the shaft A at such distance apart as that when the two friction-disks B D are in contact the socket-disks D I are in parallel vertical planes and all the adjacent parts of the clutch are in close contact. This being done, the clutch will be in action and the revolutions of the driving-shaft will impart motion to the driven shaft A through the medium of the pulley E and disks D B. It now being desired to throw the pulley E out of gear, the lever N (which has been previously fixed to one of the socket-disks in the manner before described) is turned to one side or the other, and the planes of the disks G I are turned at an acute angle to each other. By so doing the ball F, and consequently the pulley E and disk D, are released from pressure, and the spring C (within the countersinking of the friction-disk B) forces the disk D away from contact with said disk B, and thereby throws the pulley E out of gear, as desired. In order to throw said pulley in gear, the operation is reversed.

Instead of using the two ball-and-socket joints, as above described, it will be readily seen that other gimbals, with their bearings, may be used to produce the same effects, my only object in preferring the ball-and-socket joints to said additional gimbals being that a somewhat stronger and simpler connection is made in the manner shown and described.

Having thus described my invention, what I claim is—

1. In a friction-clutch in which a spring-actuated friction-disk is used, the disks G I, said disk G connected by a universal joint with the disk D, and said disk I connected in the same manner with the shaft, and the gimbal H, having bearings in said disks G I, substantially as and for the purposes described.

2. The combination, with the countersunk friction-disks B D, of the radial springs C, situated within said countersinking, and adapted to throw said disks out of engagement, for the purposes set forth.

3. The combination of the disk B, countersunk and provided with radial springs C, the disk D, carrying the pulley E, the collar L, fixed to the shaft, the balls F K, the socket-disks G I, provided with bracket-bearing $g\ i$, and the gimbal H, all arranged and operating in the manner and for the purposes set forth.

4. The within-described clutch-lever N, consisting of the sections $n\ n'$, provided with internal groove, and having handle $n^2$, substantially as and for the purposes described.

5. The combination, with the ball K and the collar L, fixed to the shaft, of the set-screws $l$, substantially as described, whereby the parts of the clutch may be tightened for the purpose of compensating for loosening or wear.

In testimony whereof I affix my signature in presence of two witnesses.

GEORGE L. BARNES.

Witnesses:
GEORGE TERRY,
DANIEL S. GLENNEY, Jr.